(12) United States Patent
Rokicki

(10) Patent No.: US 6,389,514 B1
(45) Date of Patent: May 14, 2002

(54) METHOD AND COMPUTER SYSTEM FOR SPECULATIVELY CLOSING PAGES IN MEMORY

(75) Inventor: Tomas G. Rokicki, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/277,006

(22) Filed: Mar. 25, 1999

(51) Int. Cl.$^7$ .............................................. G06F 12/08
(52) U.S. Cl. .......................... 711/136; 711/3; 711/105; 711/136; 711/157; 711/160; 365/230.03
(58) Field of Search .............................. 711/3, 105, 157, 711/136, 160; 365/230.03

(56) References Cited

U.S. PATENT DOCUMENTS 5,051,889 A * 9/1991 Fung et al. .................. 711/157
5,590,308 A * 12/1996 Shih ........................... 711/136
6,108,745 A * 8/2000 Gupta et al. .................... 711/3

OTHER PUBLICATIONS

Wulf, Wm. A. and McKee, Sally A., "Hitting the Memory Wall: Impllications of the Obvious", ACM Computer Architecture News, vol. 23, No. 1, Mar. 1995, pp. 20–24.

* cited by examiner

*Primary Examiner*—Do Hyun Yoo
*Assistant Examiner*—Mehdi Namazi

(57) ABSTRACT

The present invention provides a method and an apparatus for addressing a main memory unit in a computer system which results in improved page hit rate and reduced memory latency by only keeping open some recently used pages and speculatively closing the rest of the pages in the main memory unit. In a computer system with 64 banks and 2 CPUs, only 8 banks may be kept open and the remaining 56 banks are kept closed. Keeping only 8 banks open will not reduce the page hit frequency significantly, but will allow most accesses that are not page hits to access banks that are already closed, so that they are not slowed down by open banks. Thus, the page hit rate is increased and the miss rate is reduced.

20 Claims, 5 Drawing Sheets

METHOD AND COMPUTER SYSTEM FOR SPECULATIVELY CLOSING PAGES IN MEMORY

CROSS REFERENCE TO RELATED APPLICATION

The present application contains subject matter related to a co-pending U.S. Patent Application by Tomas G. Rokicki that was filed on Oct. 31, 1997, and entitled "A MAIN MEMORY BANK INDEXING SCHEME THAT OPTIMIZES CONSECUTIVE PAGE HITS BY LINKING MAIN MEMORY BANK ADDRESS ORGANIZATION TO CACHE MEMORY ADDRESS ORGANIZATION". This application is assigned to the same assignee as the present application, is identified by docket number HP PDNO 10970103-1 and Ser. No. 08/963,673, now U.S. Pat. No. 6,070,227, and is hereby incorporated by reference.

TECHNICAL FIELD

The present invention relates generally to computer memory systems and more specifically to configuring memory systems to optimize the use of page mode to improve the performance of computer memory systems.

BACKGROUND ART

In the art of computing, it is common to store program instructions and data in dynamic random access memory (DRAM). The most common type of DRAM memory cell is a single transistor coupled to a small capacitor. A data bit is represented in the memory cell by the presence or absence of charge on the capacitor. The cells are organized into an array of rows and columns.

FIG. 1 (PRIOR ART) is a block diagram of a typical prior art memory chip 10 that is based on a 4 megabit memory array 12 having 2,048 rows and 2,048 columns. Memory chip 10 has a 4-bit wide data input/output path. Row demultiplexor 15 receives an 11-bit row address and generates row select signals that are provided to memory array 12. Page buffer 14 acts as a temporary storage buffer for rows of data from array 12. Column multiplexor 16 receives a 9-bit column address and multiplexes the 4-bit data input/output path to a selected portion of buffer 14.

The distinction between rows and columns is significant because of the way a memory access proceeds. Page buffer 14 is formed from a single row of cells. The cells act as a temporary staging area for both reads and writes. A typical DRAM access consists of a row access cycle, one or more column accesses cycles, and a precharge cycle. The precharge cycle will be described in greater detail below.

The row access cycle (also called a page opening) is performed by presenting the row address bits to row demultiplexor 15 to select a row. The entire contents of that row are then transferred into page buffer 14. This transfer is done in parallel, and it empties all memory cells in that row of their contents. The transfer is done by driving whatever charge exists in each row capacitor down to a set of amplifiers that load page buffer 14. This operation also erases the contents of the capacitors of the row that is accessed. For typical prior art DRAMs, this operation takes approximately 30 ns.

Next, the column access cycle is performed by presenting the column address bits to select a particular column or set of columns, and the data is either read from or written to page buffer 14. During the column access cycle, page buffer 14 acts as a small RAM. The typical access delay for this operation is approximately 30 ns to receive the first 4 bits of data, and 10 ns to receive subsequent 4 bit chunks of data. Several consecutive accesses can be made to the page to access different columns, thereby allowing the entire row to be written to or read from very quickly. For a typical four bit wide DRAM such as that shown in FIG. 1 (PRIOR ART), a page of 2,048 bits (or 256 bytes) can be read out in 512 accesses, or 5.14 $\mu$s. Accordingly, the bandwidth of DRAM chip 10 is about 50 megabytes per second. It is easy to see how a few DRAM chips in parallel can yield very high bandwidth.

The final cycle of the memory access is the precharge cycle, which is also known in the art as page closing. As discussed above, the row access cycle destroyed the contents of the capacitors of the row that was read into buffer 14. Before another row can be read into buffer 14, the contents in page buffer 14 must be transferred back to memory array 12. This process is called the precharge cycle. In most prior art DRAM chips, no address is required because the address of the open row is latched when the contents of that row are transferred into buffer 14, and that address is retained as long as the page is open. Typically, the precharge cycle lasts about 40 ns.

In addition to the normal read and write access cycles, most DRAMS also require refresh cycles. The small capacitors that make up each memory cell suffer from leakage, and after a short period of time, the charge will drain away. To prevent the loss of data, each row must be precharged (opened and closed) at a certain minimum rate. The size of the capacitors and leakage allowed is balanced with the size of the array in such a way that the number of refresh cycles required is a small fraction of the total bandwidth of the DRAM. Typically, DRAMs are engineered such that refreshing the rows at a rate of one row per 60 microseconds is sufficient to maintain the data. This refresh cycle requires the page buffer to store the row being refreshed. Thus, while data can be written to and read from page buffer 14 many consecutive times, buffer 14 cannot be held open indefinitely because it must be periodically closed to allow other rows to be refreshed.

There are two primary types of DRAMs known in the art, asynchronous DRAMs and synchronous DRAMs. Asynchronous DRAMs do not have a clock input. Rather, complex timing constraints among various signals and addresses must be satisfied in order for the DRAM to operate properly. The two main control pins for asynchronous DRAMs are "row access strobe" (RAS) and "column address strobe" (CAS). To open a row, RAS is asserted (typically, lowered). To close a row, RAS is deasserted. To access a column CAS is asserted, and to access another column, CAS must be deasserted and then reasserted. Note that CAS can be asserted and deasserted multiple times while RAS is asserted.

In contrast to asynchronous DRAMs, synchronous DRAMs (SDRAMs) accept a clock input, and almost all timing delays are specified with respect to this clock. In addition, SDRAMs usually have two or four different logical arrays of memory (or banks) that can operate independently. Rather than use separate RAS and CAS signals for each bank, a sequence of commands is sent to the DRAM synchronously to perform page opening, column access, and page closing functions. Additional address bits are used for bank selection. One major benefit provided by SDRAMs is pipelining. While one bank is being accessed, another bank can be refreshed or precharged in the background.

Despite these differences, SDRAM organization is very similar to asynchronous DRAM organization. In fact, many memory controllers for asynchronous DRAMs support multiple banks and background refreshing and precharging operations.

DRAM chips can be organized to form main memory systems in a variety of ways. Typically the width and speed of the system bus are matched to the width and speed of the main memory system bus by providing the main memory system bus with the same bandwidth as the system bus. Usually system busses are both faster and wider than the data I/O interface provided by individual DRAM chips, so multiple DRAM chips are arranged in parallel to match the bandwidth of the system bus. If a particular computer system has a 16 byte wide data bus that operates at 66 MHz, then a main memory subsystem of the computer system that operates at 33 MHz and is constructed with 4-bit wide DRAM chips will typically have 64 DRAM chips arranged in each bank, thereby providing each bank with a bandwidth of nearly a gigabyte per second, which matches the bandwidth of the system data bus. If the bandwidths are not matched, other techniques may be employed, such as using a small FIFO to buffer memory accesses and blocking memory accesses when the FIFO is full.

It is also common for computers to use cache memories to increase performance. A cache memory holds a subset of the contents of main memory and is faster and smaller than main memory. An architecture common in the art provides a level one (L1) cache on the same integrated circuit as the microprocessor, and a level 2 (L2) cache on the system board of the computer. L1 cache sizes are generally in the range of 8 kilobytes to 128 kilobytes, and L2 cache sizes are generally in the range of 256K bytes to 4M bytes. The smallest unit of memory that can be loaded into a cache memory is known in the art as a cache line.

In a computer system having 16 byte wide system and memory data busses, assume that the cache line size is 64 bytes. Therefore, it will generally take four bus clock ticks for each load to, or store from, a cache line. If the computer's data bus is clocked faster than the DRAMs, it is common to use a small pipelining FIFO to match the speeds, as discussed above. Another alternative is to use a wider memory bus and multiplex it at high speeds onto the Computer's data bus, which is also discussed above.

For simplicity, assume that the computer system described above uses a small pipelining FIFO. If each bank is arranged as 32 4-bit wide DRAM chips to match the width of the system data bus, the minimum memory increment (a single bank) is 32 4-megabit chips, which is 16 megabytes. Typically, when addressing more memory, in order to keep physical memory contiguous, the high order physical address bits are used to select different banks.

Consider a logical address comprised of 32 bits, with each address value capable of being represented by the logical address indexing a byte. In the computer system described above, the memory bus is 16 bytes wide. Therefore, the least significant 4 address bits are ignored because these bits are implicitly represented by the arrangement of DRAM chips within a bank. Since the cache lines are 64 bytes long, the next 2 address bits act as column index bits that are cycled to obtain an entire cache line. The next 7 bits are assigned to the remaining column address bits, and the next 11 bits are assigned to the row address bits. Note that FIG. 1 (PRIOR ART) shows nine column address bits because the two address bits that are used to access a cache line are manipulated by a memory controller, which is not shown in FIG. 1 (PRIOR ART).

This is a total of 24 bits, which correctly matches the 16-megabyte memory bank size discussed above. The address bits between the $25^{th}$ and $32^{nd}$ bit, inclusive, are used to select a particular memory bank, or are unused. The first bank of 32 chips will be selected if addresses are within the first 16 megabytes of the physical address range, the second bank of 32 chips will be selected if addresses are within the next 16 megabytes, and so on. This is the simplest and most common way to select different groups of memory chips, and is widely used in the art.

Consider page buffers of the DRAM chips that form a single bank. All the individual page buffers are accessed in parallel, thereby combining to form a larger "logical" page buffer. As shown in FIG. 1 (PRIOR ART), each DRAM chip 10 has a 2,048 bit, or 256 byte, page buffer 14. Since 32 chips are arranged in parallel, the logical page buffer is 8,192 bytes wide. If the low order address bits are used to index columns, two memory locations having addresses that differ only in the lower 13 bits of the logical memory address will be in the same row, and therefore will be available in a logical page buffer concurrently.

Each bank of 32 parallel DRAM chips has its own set of page buffers. Therefore, a logical page buffer exists for each memory bank provided in the computer system. If the high order address bits are used to select banks, as described previously, then there is an 8 kilobyte logical page buffer for the first 16 megabytes of physical memory, another 8 kilobyte logical page buffer for the next 16 megabytes of physical memory, and so on.

If the system described above employed SDRAMs having bank select bits, the internal banks of the SDRAMs may be viewed as collections of relatively independent banks of DRAMs, with the high order address bits used as bank select bits. Accordingly, for the purpose of illustrating the present invention below, there is little difference between memory banks that are derived from collections of chips addressed independently, and memory banks that are derived from bank select inputs to specific SDRAM chips.

Consider a typical cache line read in the system described above. First, the appropriate bank is selected, and then a row is transferred into the logical page buffers. This takes approximately 30 ns. Next, 4 16-byte chunks are read from the logical page buffer; this takes approximately 60 ns (30 ns for the first 16 byte chunk, and 10 ns for each of the next three 16 byte chunks), and provides a complete cache line. Finally, the logical page buffer is closed; this takes 40 ns. The total time was 130 ns. The time before the first word was read was 60 ns (page open plus first column access). Many systems are configured such that the first word available is the first word required by the CPU. The time required to retrieve the first word is known in the art as the "critical word latency".

It is common in the art for a memory controller to gamble that successive references to the same memory bank will access the same row (or page). Such a memory controller is known as a page mode memory controller. A page hit occurs when the memory controller processes a memory access request, and finds that the row that needs to be accessed is already in the logical page buffer. In a page mode memory controller, the page is not closed after an access. Instead, the page is only closed when an access to that bank requires a different page or a refresh cycle occurs.

If a subsequent memory access is indeed for the same page, then the critical word latency is shortened from 60 ns to just 30 ns, a significant savings. If a subsequent memory access is not for the same page, then a penalty is incurred. The old page stored in the logical page buffer must undergo a precharge cycle before a new page can be opened, so the critical word latency is 40 ns (precharge) plus 30 ns (row access) plus 30 ns (first word available), or 100 ns, quite a bit more than the previous value of 60 ns that is achieved when the logical page buffer is precharged after every access.

If p is the probability that the next access is on the same page, then the average critical word latency is 30 ns*p+100 ns*(1-p), (or 100 ns-70 ns*p). Note that the critical word latency decreases asp increases. The point at which the gamble pays off is when the average critical word latency is 60 ns, which, as described above, is the critical word latency achieved when the logical page buffer is closed after each memory access. Accordingly, the point at which it pays to keep the logical page buffer open after each access occurs when there is a greater than 0.571 probability that a sequential memory access will reference the same page.

Assume that in a computer system having a page mode memory controller requests are fed to the memory controller as fast as they can be consumed. Each time a page in a bank is accessed for the first time requires a precharge cycle to close the old page and a row access page to open the new page, which together require 70 ns. As described above, each cache line access from an open page requires 60 ns. Thus, an average cache line access requires 60 ns+70 ns (1-p), (or 130 ns-70 ns*p). In contrast, as discussed above, a non-page mode memory controller requires 90 ns. Similarly, the point at which it pays to keep the logical page buffer open after each access occurs when there is a greater than 0.571 probability that a sequential memory access will reference the same page.

As the processor clock rates and scalarity increases, it is becoming more important to reduce memory latency. A method to improve the success rate of a page hit in a page mode memory controller and reduce memory latency so as to improve the overall performance of a computer system has long been sought but has eluded those skilled in the art.

DISCLOSURE OF THE INVENTION

The present invention provides a method and an apparatus to improve the success rate of a page hit in a page mode memory controller and reduce memory latency so as to improve the overall performance of a computer system.

The present invention provides a method and an apparatus for addressing a main memory unit in a computer system which results in improved page hit rate and reduced memory latency by only keeping open some recently used pages and speculatively closing the remaining pages in the main memory unit.

The present invention further provides a method of accessing a main memory unit using a logical address generated by a processor in a computer system. The main memory unit is organized in banks, rows and columns and is addressed via bank, row and column bits. Each bank includes a plurality of rows, and the computer system includes a memory controller coupled between the processor and the main memory unit. The memory controller includes a plurality of bank controllers that are addressed by the bank bits, and the bank bits are maintained in a queue or stack. The method includes (1) selecting a predetermined number of bank controllers, each selected bank controller opens a corresponding bank, and each opened bank opens one of the plurality of rows; (2) maintaining the bank bits of the predetermined number of bank controllers using the queue.

The present invention still further provides a computer system in which page hit rate is optimized and memory latency is reduced. The computer system includes: (1) a processor that generates a logical address to facilitate memory accesses, the logical address includes bank index bits; (2) a main memory unit that is organized in banks, rows and columns; and (3) a memory controller coupled between the processor and the main memory unit. The main memory unit is addressed via bank, row and column bits, and each bank includes a plurality of rows. The memory controller generates from the logical address the bank, row, and column bits required by the main memory unit. The bank index bits are used to generate one or more bank bits, and includes a plurality of bank controllers that are addressed by the bank bits. The bank bits are maintained in a queue, and the queue is operable to select a predetermined number of bank controllers.

The above and additional advantages of the present invention will become apparent to those skilled in the art from a reading of the following detailed description when taken in conjunction with the accompanying drawings.

BEST MODE FOR CARRYING OUT THE INVENTION

The present invention provides a method for accessing a main memory unit in a computer system with optimized page hit rate and reduced memory latency. In accordance with the present invention, only a predetermined number of pages in the main memory unit are kept open and the rest of the pages are kept closed. Thus, in a computer system with 64 banks and 2 CPUs, only 8 banks may be kept open and the remaining 56 banks are kept closed. It should be noted that keeping only 8 banks open will not reduce the page hit frequency significantly, but will allow most accesses that are not page hits to access banks that are already closed, so that they are not slowed down by open banks. Thus, the page miss rate (which is the cost of having a page mode memory controller) is reduced.

Figure 1:
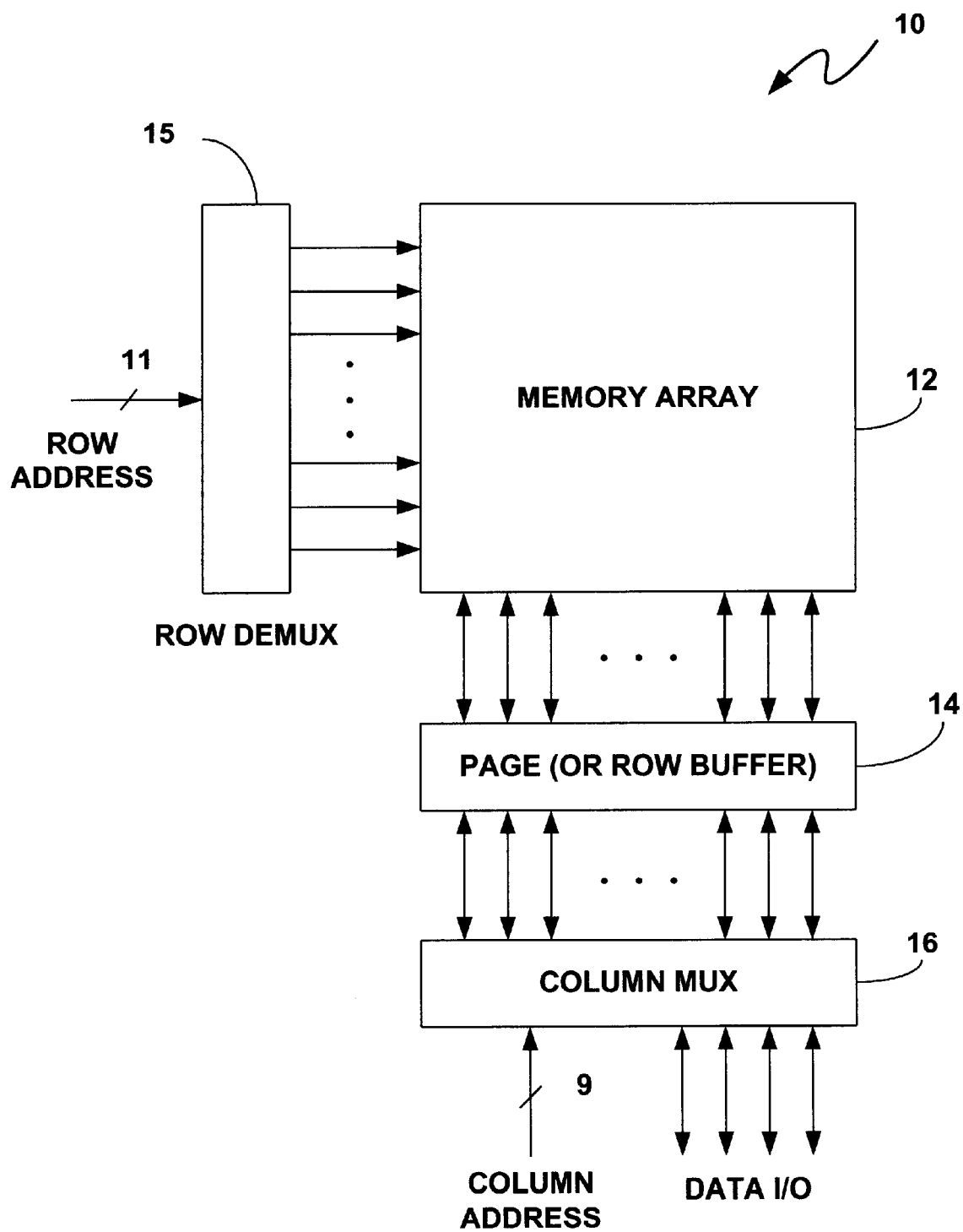
FIG. 1 (PRIOR ART) is a block diagram of a typical prior art memory chip that is based on a 4 megabit memory array having 2,048 rows and 2,048 columns.
Figure 2:
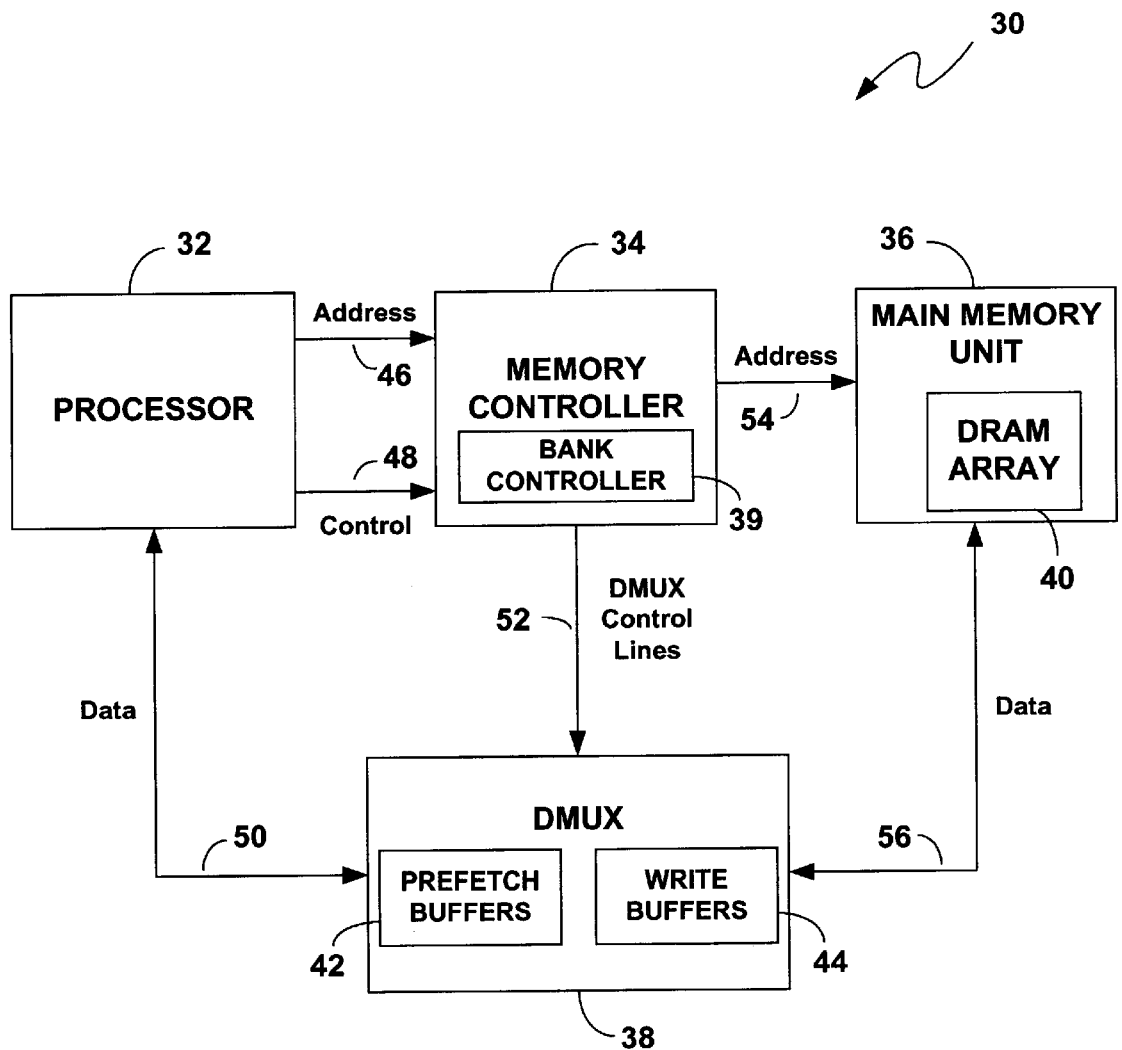
FIG. 2 is a block diagram of a computer system constructed in accordance with the present invention.

Referring now to FIG. 2, therein is shown a block diagram of a memory system constructed in accordance with the present invention. The computer system 30 includes a central processing unit (CPU) 32, a memory controller 34, a main memory unit 36, and data multiplexors/bus drivers (DMUX) chips 38. The memory controller 34 includes a number of internal bank controllers 39. The main memory unit 36 includes a DRAM array 40. The DMUX chips 38 include prefetch buffers 42 and write buffers 44. The CPU 32 is coupled to the memory controller 34 via address busses 46 and control busses 48. The CPU 32 is also coupled to DMUX chips 38 via data busses 50. The memory controller 34 is coupled to DMUX chips 38 via DMUX control lines 52. The memory controller 34 is also coupled to the main memory unit 36 via address busses 54. The main memory unit 36 is coupled to the DMUX chips 38 via data busses 56.

The memory controller 34 is responsible for all arbitration of busses, timing of commands, and page mode control. It contains state and state machines to control page mode accesses and to make sure the timing requirements are satisfied. The memory controller 34 is connected to the address and control busses from the CPU 32, and it drives the DMUX control lines 52. The memory controller 34 generates commands for the main memory unit 36. If electrical loading or pin count is a concern, it may be necessary to introduce additional demultiplexors or simple state machines between the memory controller 34 and the main memory unit 36.

The DRAM array 40 includes a number of DRAM chips or SIMMs or DIMMs. One DRAM 'rank' is the number of chips over which a single cache line is distributed. Each rank may have multiple banks. DRAMs with 2 or 4 banks per chip are common, and it is expected that this number will rise in the future. Multiple ranks may share address and/or data lines, or they may be separated into separate busses to minimize contention and maximize memory-side bandwidth. It is important that the number of addressable banks is maximized since the primary factor in improving page mode hit rate is the total number of addressable banks and not necessarily the number of bank controllers in the memory controller or the number of banks open at a given time.

The DMUX chips 38 are responsible for meeting the timing and loading requirements of the data busses 50 and 56. In almost all memory system designs, DMUX chips 38 are required in order to connect a number of usually wide, slow, heavily loaded (several chips) DRAM busses to a faster, narrower bus with tighter loading requirements. In this embodiment, DMUX chips 38 include a number of prefetch buffers 42 and write buffers 44. The prefetch buffers 42 are used to hold data that was speculatively fetched from the DRAM array 40 in hope that it would be used in the subsequent memory accesses. The write buffers 44 are needed to buffer data taken off the data busses 50 during a write command and hold it until the DRAM array 40 can be made ready to accept the data. The DMUX control lines 52 are used to indicate whether to drive or read from the DRAM array 40 and/or data busses 50, and whether to forward the data to the other bus or to store it to or read it from a particular buffer on the DMUX chips 38. While it is possible (and even advantageous) for these prefetch and write functions to share the same pool of buffers, it will be assumed that there is a fixed, finite number of prefetch buffers 42.

It should be noted the DMUX chips 38 can be and are typically heavily bit sliced. Thus, for a 64-bit data bus and 256-bit DRAM bus, rather than have a single huge chip, this function is typically divided up into around eight smaller chips, each driving 8 bits of the data bus and 32 bits of the DRAM bus. This makes it much cheaper to support multiple DRAM busses (to reduce contention) and it also means that memory added to a single DMUX chip is multiplied by the number of DMUX chips 38 in the system. If 16,384 bytes of static memory can be placed into a single DMUX chip 38, eight chips would have 256 bytes of memory total, and the control would be no more complex than if there were just a single DMUX chip 38.

The memory controller 34 has a number of internal bank controllers 39. At any time, each bank is either idle (closed) or else controlled by a single bank controller 39. There can be more banks than bank controllers 39.

Each bank controller 39 has a number of states, including:

State: one of INV (invalid), OPEN, or PREF (prefetched).

Bank: the value of the bank index bits indicating which bank the bank controller 39 currently controls; only valid if the state is OPEN or PREF.

Page: the value of the row bits indicating which page in the bank is currently open; only valid if the state is OPEN or PREF.

PrefetchLine: the value of the column bits indicating which cacheline is in what prefetch buffers if the state is Prefetched; if the state is Open, holds the address the most recent read request for this bank, plus one cacheline.

Prefetchindex: the number of the prefetch buffer 42 that holds the prefetched data (if any).

Figure 3A:
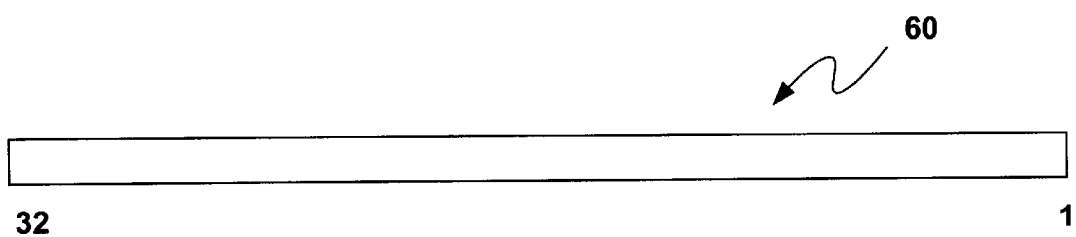
FIG. 3A shows the logical address range that is used by the computer system of FIG. 2 to access memory.

Referring now to FIG. 3A, therein is shown the logical address 60 that is used by CPU 32 to access memory. Logical address 60 is 32 bits wide.

Figure 3B:
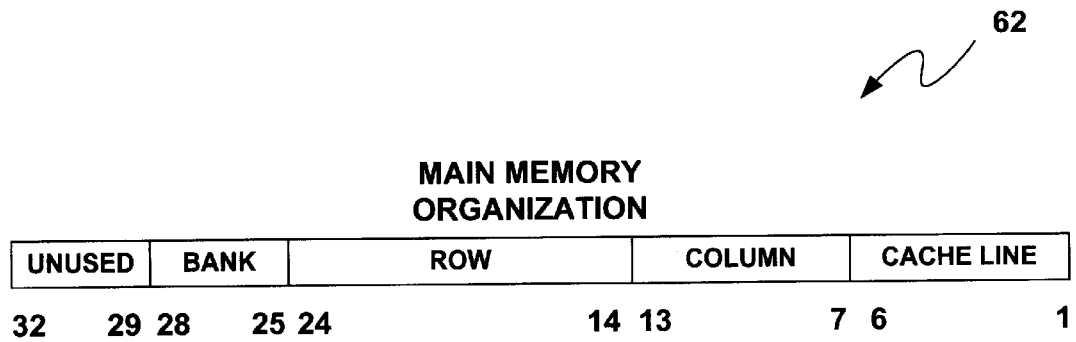
FIG. 3B shows address map that represents the bits that are used to access the memory of main memory unit shown in FIG. 2.

Referring now to FIG. 3B, therein is shown the address map 62, which represents the bits that are used to access the memory banks of main memory unit 36. Bits 1–6 represent the 64 bytes within a cache line. The next 7 bits (bits 7–13) are the column bits. Bits 14–25 are the 11 row bits. Finally, bits 25–28 are the 4 bank index bits. Bits 29–32 are unused. Accordingly, 28 bits of the 32-bit address are used to access main memory unit 36. This represents a typical, although not optimal, memory indexing function. The present invention applies to any memory indexing function, including those better indexing functions referred to in the Rokicki patent application, supra., incorporated by reference.

Figure 4:
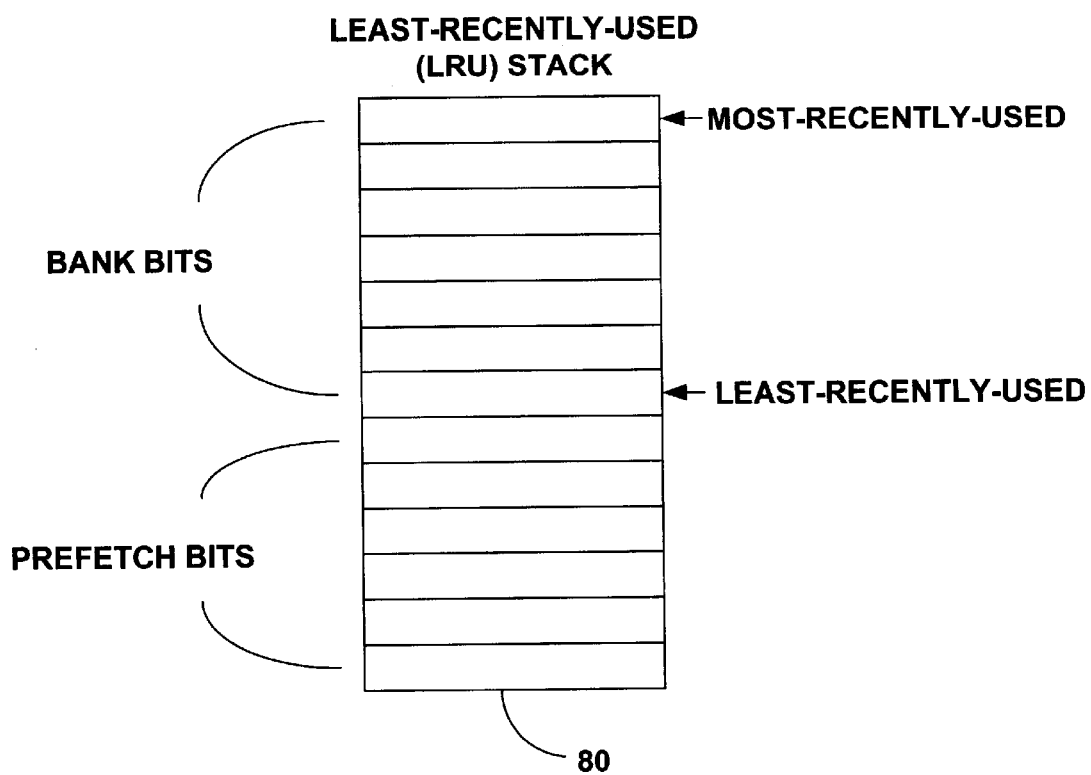
FIG. 4 is a block diagram of a least-frequently-used (LRU) stack.

Referring now to FIG. 4, therein is shown a least-recently-used (LRU) stack 80 for maintaining the bank controller bits (bank bits) and the prefetch buffer bits (prefetch bits). Portions of the bank bits may be used as rank bits. The bank controllers 39 are organized into an array. The LRU stack 80 supports two operations: move a particular bank bit to the top of the LRU stack 80 (the most-recently-used location) when the bank bit is accessed by the processor, and return the bank bit at a particular (predetermined) depth in the LRU stack 80 according to the time when the bank bit was last accessed by the processor. This structure allows the correct bank controller to be easily identified and to be 'reused' by finding one sufficiently old. The general indexing scheme, which is easily implemented by persons skilled in the art, allows the programmable selection of a predetermined number of bank controllers that will be in use in a particular system. The present invention also covers various LRU approximations and replacement strategies including pseudo LRU, circular (clock) queue, and random replacement.

The prefetch buffers 42 in the DMUX 38 are also organized into an array. The memory controller generates a PrefetchLine bit (prefetch bits) based on the prefetch index bit (a portion of the logical address). The PrefetchLine bit is maintained in the LRU stack 80. If the number of prefetch buffers 42 is the same as the number of bank controllers 39, the computer system 30 is somewhat simplified and the same indices can be used for the prefetch buffers 42 and the bank controllers 39.

For the purposes of discussion, the following is a simplified illustration of the actions that cause state changes in the bank controller 39. Most of the actions listed below take some amount of time to complete, so there may be potential state transitions from partially completed actions.

From INV action open to OPEN: A read or write transaction from the bus to a closed bank will obtain a new bank controller 39 by selecting the least recently used one; if this bank controller is in the INV state, the appropriate DRAM bank will be opened.

From OPEN or PREF action open/close to OPEN: A read or write transaction from the bus to a closed bank will obtain a new bank controller 39 by selecting the least recently used one; if this bank controller is in the OPEN or PREF state, and the bank being controlled is different from the bank corresponding to the read or write transaction, the OPEN of the new bank and the close of the old bank will proceed in parallel.

From OPEN or PREF action close to INV: A read or write transaction from the bus to a closed bank will obtain a new bank controller by selecting the least recently used one; if this bank controller is in the OPEN or PREF state, and the bank being controlled is the same as the bank corresponding to the read or write transaction, the current page must be closed; a later open transition will open the new bank. This transition will also fire for all banks if the refresh timer has expired, indicating that it is time to refresh all banks.

From OPEN or PREF action access to OPEN or PREF: A read or write transaction to the open page in an open bank but does not match in the prefetch buffer 42 will simply perform a column access. If the access is a read access, the final destination will be OPEN and the PrefetchLine bits updated; if it is a write access, the final state is the same as the initial state and the PrefetchLine values are not modified. This transition also completes the read or write transaction.

From OPEN action prefetch to PREF: If no transaction is outstanding for this bank, and the PrefetchLine value has been set, and the PrefetchIndex value is valid indicating that we have a prefetch buffer, a speculative prefetch is issued to fetch the line into the prefetch buffer.

From OPEN or PREF action reclaim to OPEN: Whenever a bank controller falls to a depth in its LRU stack greater than the number of prefetch buffers 42, its current prefetch buffer is reclaimed and handed to the bank controller just pushed to the top of the LRU stack 80.

From INV action refresh to INV: A refresh cycle is performed when all banks are in the idle state after the refresh timer has expired.

The details of other LRU approximations and replacement strategies including pseudo-LRU, circular (clock) queue, and random replacement that can be used with the present invention will now be described.

Figure 5:
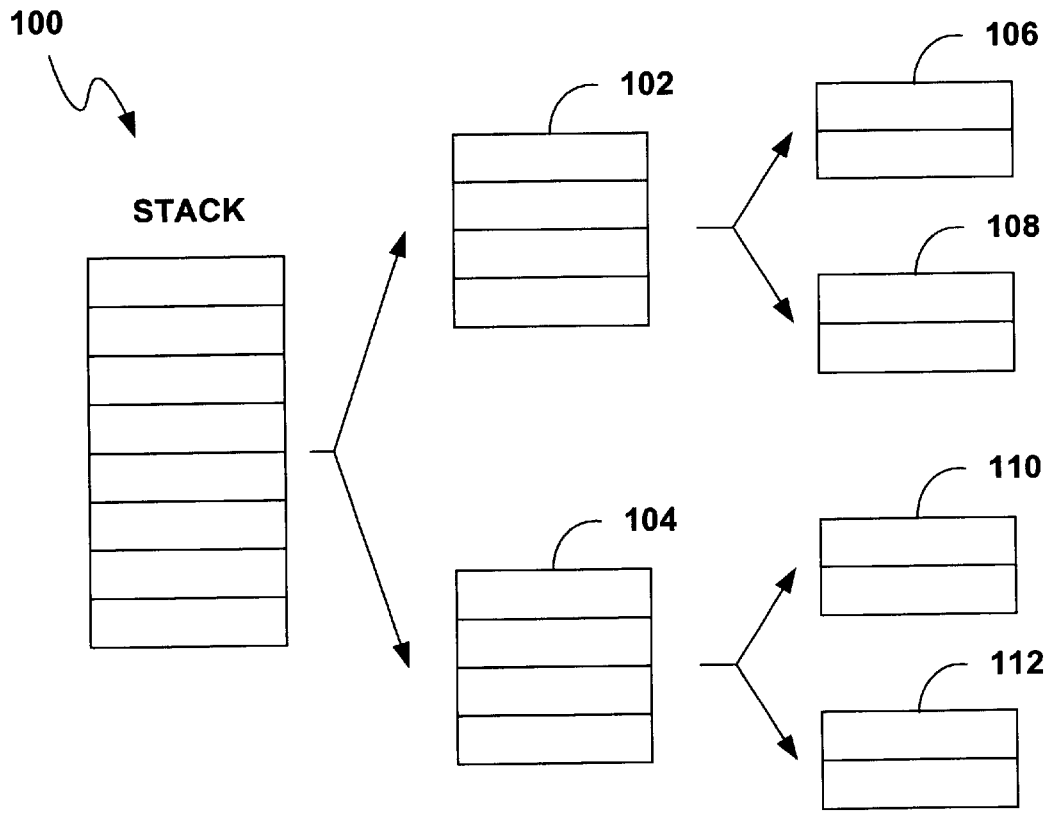
FIG. 5 is a block diagram of a pseudo least-frequently-used (LRU) stack that can be used in connection with the present invention.

A pseudo-LRU is an approximate LRU scheme that divides a single replacement set into nested sets and performs LRU scheme on each level of nested sets for each replacement. Referring now to FIG. 5, there is shown a typical pseudo-LRU scheme in which an eight-element stack 100 is divided into a plurality of LRUs: a first level with two four-element stacks 102 and 104; and a second level with four two-element stacks 106, 108, 110, and 112. The typical LRU scheme is performed on each of the two-element stack 106, 108, 110, and 112.

Figure 6:
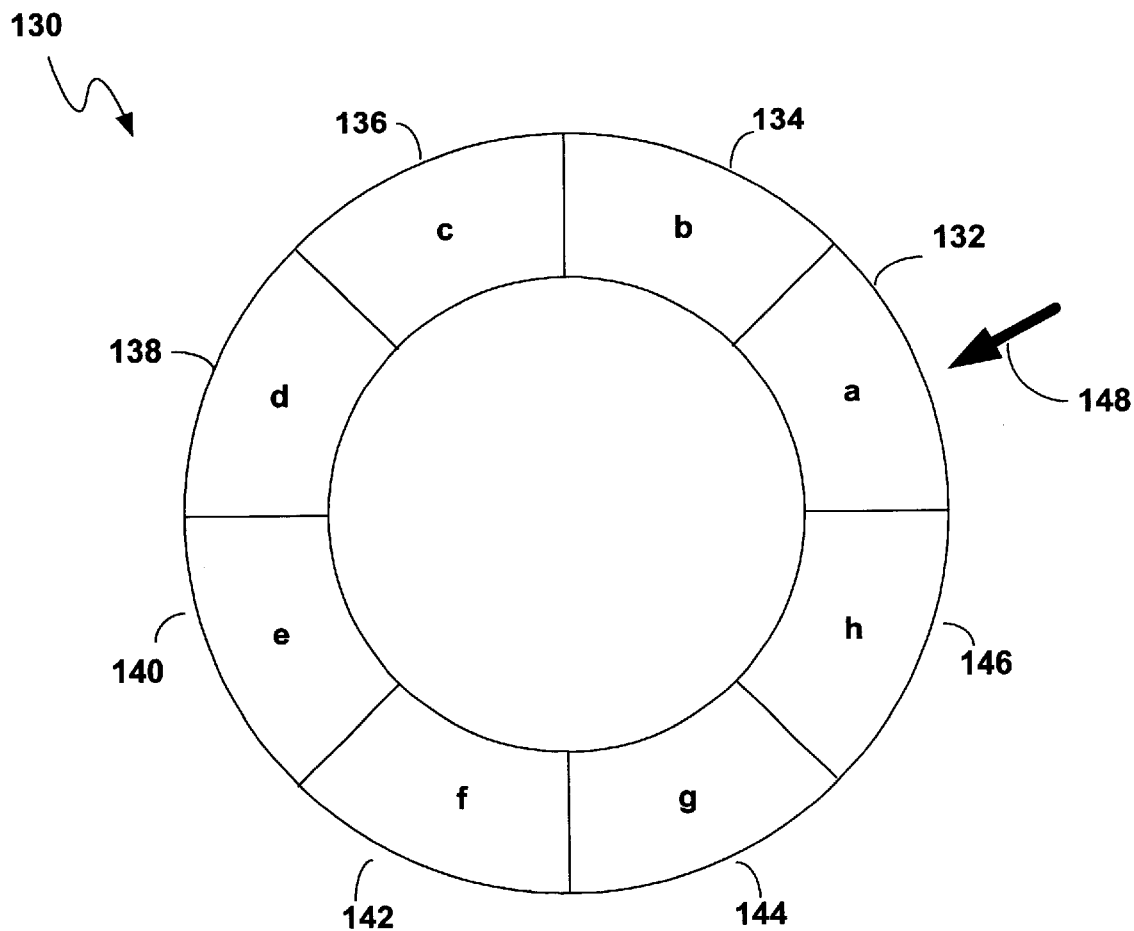
FIG. 6 is a block diagram of a circular (clock) queue that can be used in connection with the present invention.

Referring now to FIG. 6, there is shown a circular (clock) queue 130 that can be used with the present invention. The clock queue 130 includes eight data slots (locations) 132, 134, 136, 138, 140, 142, 144, and 146 arranged in a circle for maintaining bank bits a, b, c, d, e, f, g, and h respectively. Bank bits a, b, c, d, e, f, g, and h is for addressing banks A, B, C, D, E, F, G and H (not shown) respectively. Each slot has a flag (not shown) which is either raised or lowered. Whenever a bank bit is accessed, the flag of the slot in which the bank bit is maintained is raised. A pointer 148 sweeps the clock queue 130 and points to a particular slot at any given time. In FIG. 6, the pointer 148 is pointing to slot 132 where bank bit a for bank A (not shown) is maintained. When a new bank, for example, bank I (not shown), needs to be opened, another bank will have to be replaced. If slot 132 has its flag lowered, bank bit a will be replaced, and bank bit i for bank I will take its place in the slot. The flag for slot 132 will be raised and the pointer 148 is then advanced. If slot 132 has its flag raised, the flag will be lowered, and the pointer 148 will be advanced to the next slot. This process is repeated until a slot with its flag lowered is found. When that happens, the bank bit in that slot will be replaced by bank bit i. The flag for that slot will then be raised and the pointer 148 is then advanced.

Figure 7:
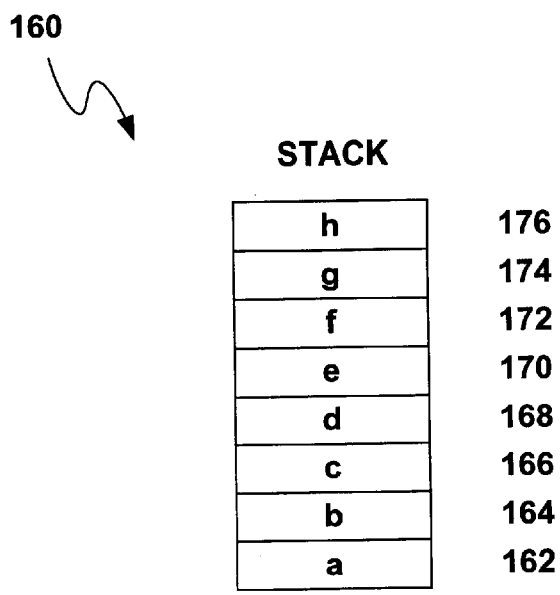
FIG. 7 is a block diagram of a queue that can be used to perform random replacement that can be used in connection with the present invention.

Referring now to FIG. 7, there is shown a queue 160 that can be used with the present invention to allow for random replacement of bank bits. Queue 160 includes data slots (locations) 162, 164, 166, 168, 170, 167, 174, and 176 for maintaining bank bits a, b, c, d, e, f, g, and h respectively. Bank bits a, b, c, d, e, f, g, and h is for addressing banks A, B, C, D, E, F, G and H (not shown) respectively. When a new bank, for example, bank I (not shown), needs to be opened, one of the banks that is currently opened will have to be replaced. In the random replacement scheme, one of the slots (162, 164, 166, 168, 170, 167, 174, and 176) will be randomly selected so that bank bit i for bank I will be moved to that slot and replace the content of the slot when bank bit i is first accessed by said processor.

The operation of the computer system 30 constructed in accordance with the present invention (FIGS. 2 to 4) using a LRU will now be described.

A bank controller is selected. The bank index bits (memory reference) of the logical address issued by the CPU 32 is compared against the bank bits of all the memory bank controllers 39; if one matches, this is the bank controller for that reference. Otherwise, the least recently used bank controller is the bank controller for that reference. In any case, this bank controller 39 is moved to the top of the LRU queue, and is given a PrefetchIndex to a prefetch buffer 42 if it does not already have one (which may initiate a reclaim in some other bank controller).

The prefetch status is checked. If the Bank, Page, and PrefetchLine bits all match the address of the reference, and the reference is a read, and the state of the bank controller is PREF, then the data is driven directly to the bus to complete the transaction. The PrefetchLine bits are set to the value from this reference and the state of the bank controller 39 is changed to OPEN to initiate the next prefetch. The remaining steps in this list are skipped. If the reference was a write and the bank controller state is PREF, a number of policies can be implemented. If the write is to the same line as the current PrefetchLine, the state of the bank controller 39 can simply be changed to OPEN. Alternatively, whether or not the write is to the same line, the state can be changed to OPEN. Because the cache effect interleaving of the bank indexing scheme tends to separate writes and reads to separate banks, there should be little penalty for simply always changing the state to OPEN on a write.

The page is opened. If the state of the bank controller 39 is not INV and both the bank and page bits match those of the reference address, the page is already open and this step is skipped. Otherwise, if the state of the bank controller 39 is not INV and the bank bits match but the page bits do not, then the wrong page on the bank is open, and we have to close the page and reopen the correct page serially. This we call a page miss. If the bank bits are different or the state of the bank controller 39 is INV, then the old bank (if any) can be closed and the new bank can be opened in parallel. This is generally known as an idle bank reference. After opening the page, the new state is OPEN.

The reference is performed through an access action. If the transaction is a read, the PrefetchLine bits are set from the reference address the resulting state is OPEN (from which a new prefetch might be initiated). Otherwise, the resulting state is the same as the state at the beginning of this step. In any case, this access transition completes the transaction and the bank is left open.

References may be classified into sequential hits, page hits, idle bank references, and page misses. A sequential hit is a reference for which the data was already in a prefetch buffer 42 or was in the process of being transferred into a prefetch buffer 42. The total latency from address on processor bus to critical word returned on data bus for such a reference might be 30 ns. A page hit is a reference for which the correct page in the correct bank was already open, and it includes all sequential hits. The latency for this form of reference will be higher-perhaps 90 ns-because the DRAMs array 40 still needed to be queried. A page miss is a reference for which some incorrect page was open in the requested bank, and thus the page close and new page open had to be performed in sequence. Such a reference might take 150 ns. An idle bank reference is a reference to a bank in which no page was open; this form of reference might take 120 ns. A memory controller that does not support page mode or prefetching will see a memory latency of 120 ns for each reference, neglecting contention. We shall use these values as typical throughout the remainder of this report when presenting performance figures.

Initiating a prefetch when no access is pending has very little effect on the latency of a following access because of the CAS latency and pipelining in the SDRAM. If no read is initiated in a particular cycle, that cycle is lost forever, and for most SDRAMs, initiating a read in a particular cycle delays a subsequent read by at most 0 or 1 cycle. There may be delays due to contention for the DRAM address or data busses, or for DRAM data bus turnaround time, but it is expected that the extra bandwidth normally available on these busses in a competitive memory design will make these effects negligible.

Prefetching cache lines into the DMUX 38 also can lead to significant latency savings. First, all latency due to the DRAM is eliminated on a prefetch hit (if the data is already in the buffers). This includes the CAS latency, but it also includes what may be a more significant contributor to the latency: the time required to drive the DRAM address busses 54 and DRAM data busses 56. Both of these busses generally suffer from significant fan-out and fan-in, and this leads to additional latency. A prefetch hit, on the other hand, involves a critical path that includes only the memory controller 34, DMUX control signals, and DMUX chips 38.

Accordingly, the present invention describes methods and apparatus to improve the performance of a computer system. By using a speculative bank precharging, i.e., allowing only a subset of banks to remain open at any given time, for example, those that are recently used, and speculatively closing the remaining banks, only a small fraction of page mode misses are to open banks, while the banks that are open capture the great majority of the possible page mode hits. As a result, the present invention significantly improves the performance of memory system by increasing the page hit rate and decreasing the risk of page misses under difficult or random workloads.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A computer system comprising:
   a processor that generates a logical address to facilitate memory accesses, said logical address includes bank index bits;
   a main memory unit that is organized in banks, rows and columns, said main memory unit is addressed via bank, row and column bits, wherein each bank includes a plurality of rows; and
   a memory controller coupled between said processor and said main memory unit, wherein said memory controller:
      generates from said logical address the bank, row, and column bits required by the main memory unit, and said bank index bits are used to generate said bank bits, and
      includes a plurality of bank controllers that are addressed by said bank bits, said bank bits are maintained in a queue, said queue is operable to select a predetermined number of bank controllers.

2. The computer system as claimed in claim 1 wherein said queue comprises a least-recently-used (LRU) stack, said LRU stack is operable to move said bank bits to the top of said LRU stack when said bank bits are accessed by said processor and return said bank bits to a predetermined depth in said LRU stack according to the time when said bank bits were last accessed by said processor.

3. The computer system as claimed in claim 1 wherein said queue comprises a circular (clock) queue, said clock queue is operable to move said bank bits to a location within said clock queue when said bank bits are accessed by said processor.

4. The computer system as claimed in claim 1 wherein said queue comprises a plurality of least-recently-used (LRU) stacks, each of said plurality of LRU stacks is operable to move said bank bits to the top of said each of said plurality of LRU stacks when said bank bits are accessed by said processor and return said bank bits to a predetermined depth in said each of said plurality of LRU stacks according to the time when said bank bits were last accessed by said processor.

5. The computer system as claimed in claim 1 wherein said queue is operable to randomly move said bank bits to a location within said queue when said bank bits are accessed by said processor.

6. The computer system as claimed in claim 1, further comprising:
   at least one data multiplexors/bus drivers (DMUX) chip, wherein said DMUX chip includes a plurality of prefetching buffers for holding data fetched from said main memory unit.

7. The computer system as claimed in claim 6 wherein said prefetching buffers are addressed by a prefetch index bit of said logical address, said memory controller generates from said prefetch index bit a PrefetchLine bit, said PrefetchLine bit is maintained in said queue.

8. The computer system as claimed in claim 1 wherein said predetermined number of bank controllers is less than around 50% of said plurality of bank controllers.

9. The computer system as claimed in claim 1 wherein said predetermined number of bank controllers is less than around 25% of said plurality of bank controllers.

10. The computer system as claimed in claim 1 wherein said predetermined number of bank controllers is approximately 12% of said plurality of bank controllers.

11. A method of accessing a main memory unit using a logical address generated by a processor in a computer system, wherein the main memory unit is organized in banks, rows and columns and is addressed via bank, row and column bits, wherein each bank includes a plurality of rows, and wherein the computer system includes a memory controller coupled between the processor and the main memory unit, the memory controller includes a plurality of bank controllers that are addressed by the bank bits, the bank bits are maintained in a queue, the method comprising:

selecting a predetermined number of bank controllers, each selected bank controller opens a corresponding bank, each opened bank opens one of the plurality of rows; and maintaining the bank bits of said predetermined number of bank controllers using the queue.

12. The method as claimed in claim 11 wherein the queue comprises a least-recently-used (LRU) stack, the method further comprising the steps of:

moving the bank bits to the top of said LRU stack when the bank bits are accessed by the processor; and returning the bank bits to a predetermined depth in said LRU stack according to the time when the bank bits were last accessed by the processor.

13. The method as claimed in claim 12 further comprising the step of:

closing a least-recently-used bank controller and its corresponding bank if a subsequent memory access requires addressing a bank controller whose bank bit is not maintained in the LRU stack.

14. The method as claimed in claim 11 wherein the queue comprises a circular (clock) queue, the method further comprising the step of:

moving the bank bits to a location within said clock queue when the bank bits are accessed by the processor.

15. The method as claimed in claim 11 wherein the queue comprises a plurality of least-recently-used (LRU) stacks, the method further comprising the step of:

moving the bank bits to the top of one of said plurality of LRU stacks when the bank bits are accessed by the processor and return the bank bits to a predetermined depth in said one of said plurality of LRU stacks according to the time when the bank bits were last accessed by the processor.

16. The method as claimed in claim 11 further comprising the step of:

randomly moving the bank bits to a location within the queue when the bank bits are accessed by the processor.

17. The method as claimed in claim 11 wherein the, computer system includes at least one data multiplexors/bus drivers (DMUX) chip, wherein the DMUX chip includes a plurality of prefetch buffers for holding data fetched from the main memory unit, and further comprising:

addressing the prefetch buffers by a prefetch index bit of the logical address, wherein the memory controller generates from said prefetch index bit a PrefetchLine bit, said PrefetchLine bit is maintained in said queue.

18. The method as claimed in claim 11 wherein the step of selecting said predetermined number of bank controllers selects less than around 50% of said plurality of bank controllers.

19. The method as claimed in claim 11 wherein the step of selecting said predetermined number of bank controllers selects less than around 25% of said plurality of bank controllers.

20. The method as claimed in claim 11 wherein the step of selecting said predetermined number of bank controllers selects approximately 12% of said plurality of bank controllers.

* * * * *